US011722994B2

(12) United States Patent
Lei et al.

(10) Patent No.: US 11,722,994 B2
(45) Date of Patent: Aug. 8, 2023

(54) FACILITATING BANDWIDTH PART SELECTION IN WIRELESS COMMUNICATION SYSTEMS

(71) Applicant: QUALCOMM Incorporated, San Diego, CA (US)

(72) Inventors: Jing Lei, San Diego, CA (US); Linhai He, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/230,741

(22) Filed: Apr. 14, 2021

(65) Prior Publication Data

US 2021/0337511 A1      Oct. 28, 2021

Related U.S. Application Data

(60) Provisional application No. 63/015,440, filed on Apr. 24, 2020.

(51) Int. Cl.
*H04W 72/02*        (2009.01)
*H04W 72/04*        (2023.01)
(Continued)

(52) U.S. Cl.
CPC .......... *H04W 72/02* (2013.01); *H04L 1/0003* (2013.01); *H04W 36/0077* (2013.01); *H04W 72/0453* (2013.01); *H04W 74/0833* (2013.01)

(58) Field of Classification Search
CPC ............. H04W 72/02; H04W 72/0453; H04W 74/0833; H04W 36/0077; H04W 72/0833;
(Continued)

(56) References Cited

U.S. PATENT DOCUMENTS

2019/0281504 A1    9/2019   Su et al.
2021/0227621 A1*   7/2021   Pan .................. H04W 72/0446

OTHER PUBLICATIONS

CATT: "UE Assistance Information", 3GPP Draft, 3GPP TSG-RAN WG2 Meeting 105bis, R2-1903128, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051700482, 2 Pages, Retrieved from the Internet: URL: http://www.3gpp.org/ftp/Meetings%5F3GPP%5FSYNC/RAN2/Docs/R2%2D1903128%2Ezip. [retrieved on Apr. 6, 2019] the whole document.

(Continued)

*Primary Examiner* — Jianye Wu
(74) *Attorney, Agent, or Firm* — Loza & Loza, LLP/Qualcomm

(57) ABSTRACT

Wireless devices are configured to facilitate UE assisted bandwidth part (BWP) selection in wireless communication systems. According to one example, a scheduled entity can receive an RRC reconfiguration message indicating a handover from a source cell to a target cell, identify uplink data in the buffer, and send an enhanced UE assistance information (UAI) transmission to the target cell, the enhanced UAI indicating a preferred BWP of the target cell. In addition, a scheduling entity can receive an enhanced UAI transmission from a scheduled entity indicating a preferred BWP for the scheduled entity, and select the preferred BWP for communication with the scheduled entity from the enhanced UAI. Other aspects, examples, and features are also included.

26 Claims, 13 Drawing Sheets

(51) Int. Cl.
*H04L 1/00* (2006.01)
*H04W 74/08* (2009.01)
*H04W 36/00* (2009.01)
*H04W 72/0453* (2023.01)

(58) Field of Classification Search
CPC ............ H04W 36/0055; H04W 74/006; H04L 1/0003; H04L 1/0025; H04L 1/0031
See application file for complete search history.

(56) References Cited

OTHER PUBLICATIONS

International Search Report and Written Opinion—PCT/US2021/028682—ISA/EPO—dated Aug. 31, 2021.
Qualcomm Incorporated: "Cross Layer Design Considerations for RedCap Device", 3GPP Draft, 3GPP TSG-RAN WG1 Meeting #105, R1-2104681, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021 (May 12, 2021), XP052010932, 4 Pages, Retrieved from the Internet: URL: https://ftp.3gpp.org/tsg_ran/WG1_RL1/TSGR1_105-e/Docs/R1-2104681.zip. R1-2104681 Cross Layer Design Considerations for RedCap Device. docx [Retrieved on May 12, 2021]. the whole document.
Samsung: "Correction of UE Assistance Information", 3GPP Draft, 3GPP TSG-RAN WG2 #108, R2-1916632, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 14, 2019-Nov. 18, 2019, Dec. 5, 2019 (Dec. 5, 2019), XP051837313, 12 Pages, Retrieved from the Internet: URL: https://ftp.3gpp.org/tsg_ran/WG2_RL2/TSGR2_108/Docs/R2-1916632.zip. R2-1916632.doc [retrieved on Dec. 5, 2019] the whole document.
Sony: "Power Saving UE Assistance Information", 3GPP Draft, 3GPP TSG-RAN WG2 Meeting #109 electronic, R2-2000869, 3rd Generation Partnership Project (3GPP), Mobile Competence Centre, 650, Route Des Lucioles, F-06921 Sophia-Antipolis Cedex, France, vol. RAN WG2, No. Elbonia, Feb. 24, 2020-Mar. 6, 2020, Feb. 13, 2020 (Feb. 13, 2020), XP051848655, 5 Pages, Retrieved from the Internet: URL: https://ftp.3gpp.org/tsg_ran/WG2_RL2/TSGR2_109_e/Docs/R2-2000869.zip. R2-2000869 Power Saving UE Assistance 1.0.doc [Retrieved on Feb. 13, 2020]—p. 3, paragraph 2.
VIVO: "Power Saving for BWP/SCell Operation in RRC_Connected", 3GPP Draft, 3GPP TSG-RAN WG2 Meeting #105bis, R2-1903201, Power Saving for BWP SCell Operation in RRC Connected, 3rd Generation Partnership Project (3GPP), Mobile Competence Centre, 650, Route Des Lucioles, F-06921 Sophia-Antipolis C, vol. RAN WG2, No. Xian, China, Apr. 8, 2019-Apr. 12, 2019, Apr. 6, 2019 (Apr. 6, 2019), XP051700553, 6 Pages, Retrieved from the Internet: URL: http://www.3gpp.org/ftp/Meetings%5F3GPP%5FSYNC/RAN2/Docs/R2%2D1903201%2Ezip. [Retrieved on Apr. 6, 2019].

\* cited by examiner

FACILITATING BANDWIDTH PART SELECTION IN WIRELESS COMMUNICATION SYSTEMS

PRIORITY CLAIM

This application claims priority to and the benefit of provisional patent application No. 63/015,440 filed in the U.S. Patent and Trademark Office on Apr. 24, 2020, the entire content of which is incorporated herein by reference as if fully set forth below in its entirety and for all applicable purposes.

TECHNICAL FIELD

The technology discussed below relates generally to wireless communication systems, and more particularly, to facilitating UE assisted bandwidth part (BWP) selection in wireless communication systems.

INTRODUCTION

Wireless communications systems are widely deployed to provide various types of communication content such as voice, video, packet data, messaging, broadcast, and so on. These systems may be accessed by various types of devices configured to facilitate wireless communications, where multiple devices share the available system resources (e.g., time, frequency, and power).

The third generation partnership project (3GPP) is an organization that develops and maintains telecommunication standards for fourth generation (4G) long-term evolution (LTE) networks. Recently, the 3GPP has begun the development of a next-generation evolution of LTE called New Radio (NR), which may correspond to a fifth generation (5G) network. As it stands today, 5G NR networks may exhibit a higher degree of flexibility and scalability than LTE, and are envisioned to support very diverse sets of requirements. Techniques applicable in such networks for facilitating power conservation and improved coverage may be desirable.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various examples and implementations of the present disclosure facilitate bandwidth part (BWP) selection in wireless communication systems. According to at least one implementation, a scheduled entity may include a transceiver, a memory, and a buffer, each coupled with a processor. The processor and the memory may be configured to receive a radio resource control (RRC) reconfiguration message indicating a handover from a source cell to a target cell via the transceiver, identify uplink data in the buffer, and convey an enhanced UE assistance information (UAI) transmission to the target cell via the transceiver in response to the RRC reconfiguration message and the identified uplink data in the buffer, the enhanced UAI indicating a preferred bandwidth part (BWP) of the target cell.

Another aspect includes a method operational on a scheduled entity. The method includes receiving a RRC reconfiguration message indicating a handover from source cell to a target cell, and identifying uplink data in a buffer. The method further includes conveying an enhanced UAI transmission to the target cell in response to the RRC reconfiguration message and the identification of uplink data in the buffer, where the enhanced UAI indicates a preferred BWP of the target cell.

According to at least one implementation, a scheduling entity may include a transceiver and a memory, each coupled with a processor. The processor and the memory may be configured to receive, via the transceiver, an enhanced UAI transmission from a scheduled entity indicating a preferred BWP for the scheduled entity, and select the preferred BWP for communication with the scheduled entity based on the received enhanced UAI.

An additional aspect includes a method operational on a scheduling entity. The method includes receiving an enhanced UAI transmission from a scheduled entity indicating a preferred BWP for the scheduled entity, and selecting the preferred BWP for communication with the scheduled entity based on the received enhanced UAI.

These and other aspects of the invention will become more fully understood upon a review of the detailed description, which follows. Other aspects, features, and examples of the present invention will become apparent to those of ordinary skill in the art, upon reviewing the following description of specific examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while examples may be discussed below as device, system, or method examples it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
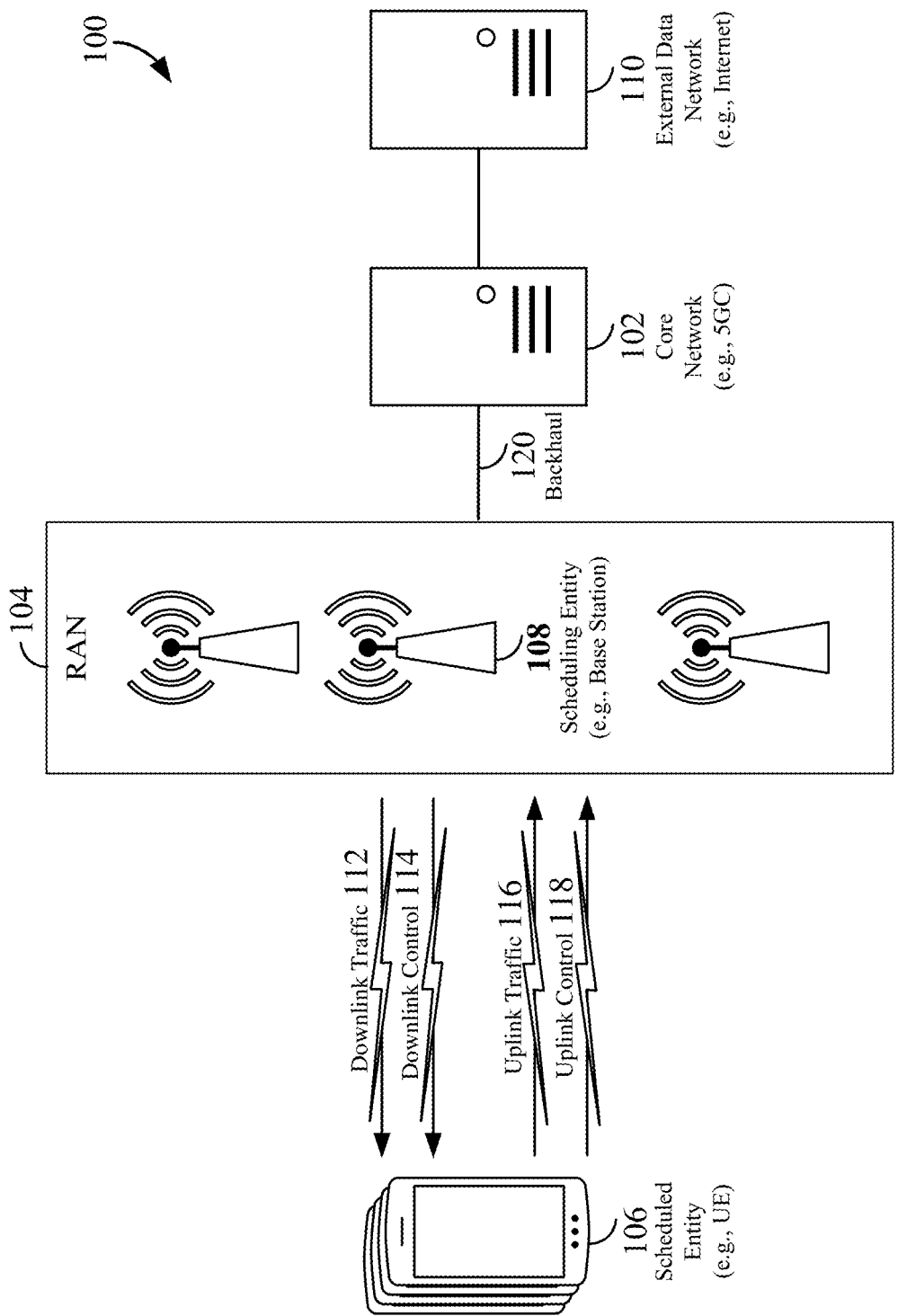
FIG. 1 is a schematic diagram illustrating an example of a wireless communication system according to some examples.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5 GC). In other examples, the core network 102 may be configured according to a 4G evolved packet core (EPC), or any other suitable standard or configuration.

Figure 2:
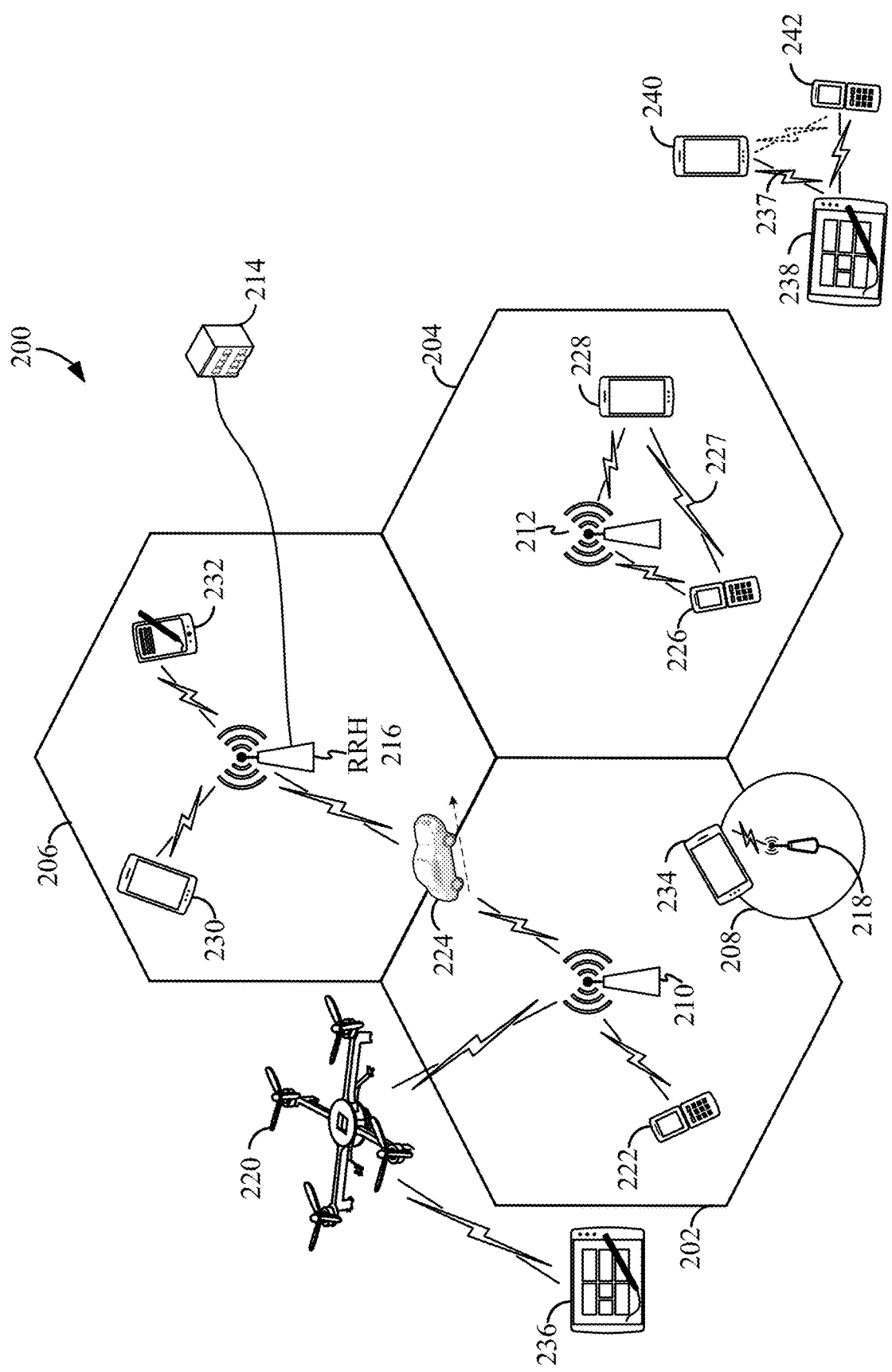
FIG. 2 is a conceptual diagram illustrating an example of a radio access network according to some examples.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
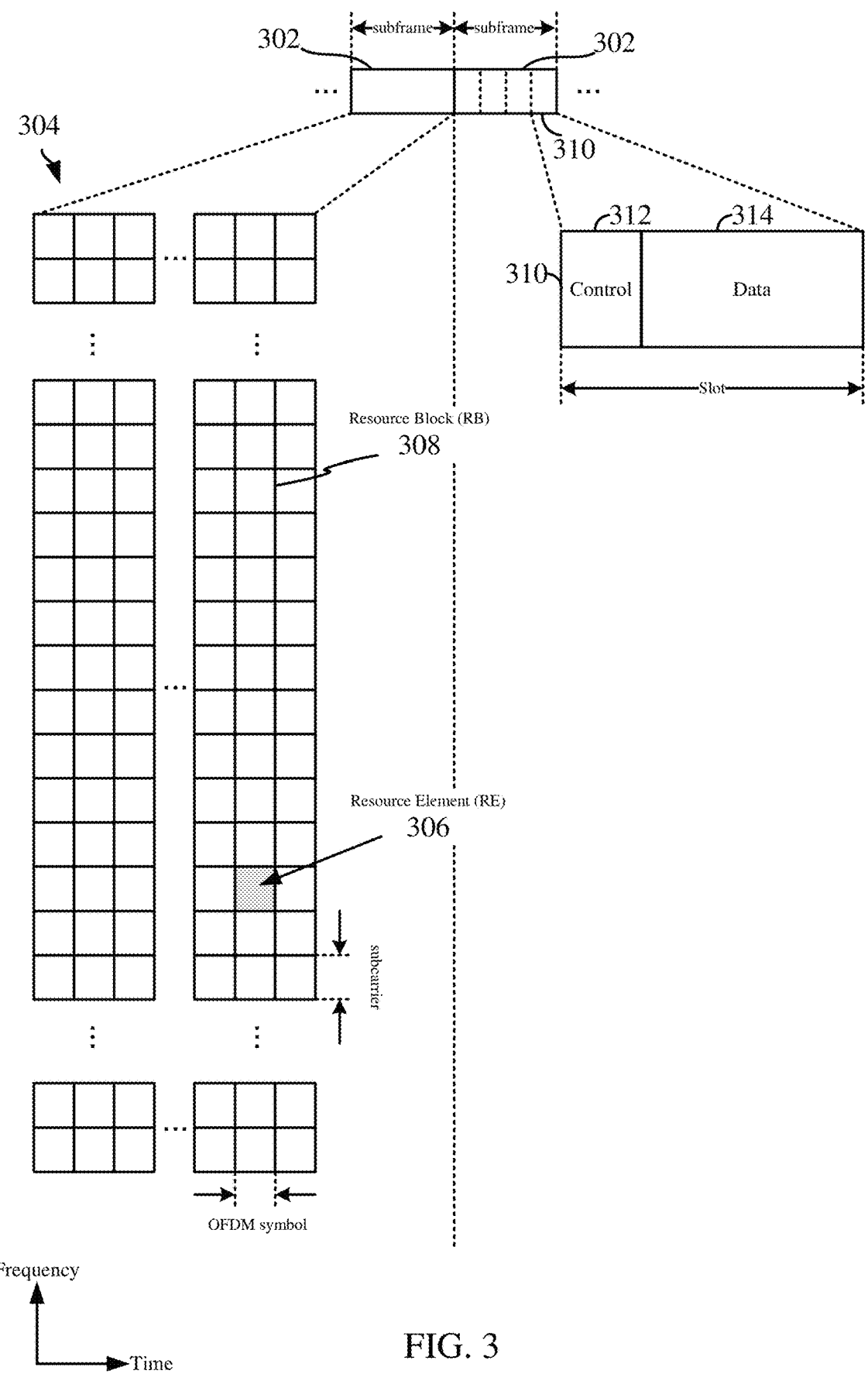
FIG. 3 is a schematic diagram illustrating organization of wireless resources in an air interface utilizing orthogonal frequency divisional multiplexing (OFDM).

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In some examples, a wireless communication system may divide the system bandwidth into a number of BWPs to facilitate power savings for the scheduled entity and for flexibility of the network to facilitate communications over the network by scheduled entities with different RF requirements.

Figure 4:
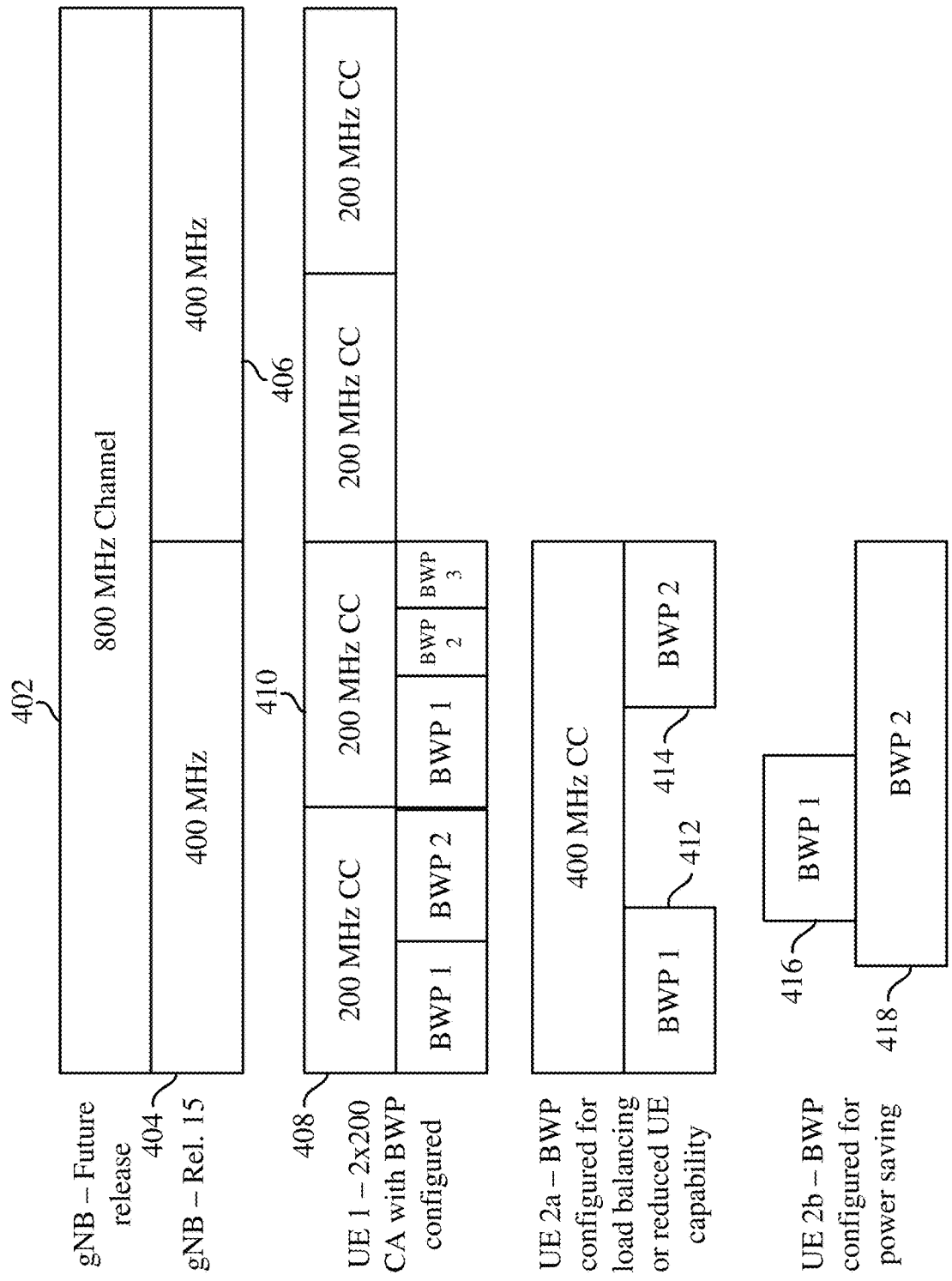
FIG. 4 is a block diagram illustrating various bandwidth configurations, including various BWP configurations.

FIG. 4 is a block diagram illustrating examples of division of a system bandwidth into BWPs. As shown, a scheduling entity, such as a gNB, may utilize by way of example an 800 MHz bandwidth channel 402 in some implementations, or may utilize an 800 MHz bandwidth in two adjacent 400 MHz channels 404, 406 in other implementations. On the scheduled entity side, FIG. 4 depicts two cases, one for a first UE (UE1) and another for a second UE (UE2). UE 1 may utilize two component carriers of 200 MHz. For each carrier, different BWPs may be configured. For example, for the first carrier 408, the UE 1 may support BWP1 and BWP2 having equal bandwidth of 100 MHz each. On the second component carrier 410, there are three BWPs. BWP1 is 100 MHz, while BWP2 and BWP3 are each 50 MHz.

Turning to UE 2 in FIG. 4, in a first configuration of UE2 (UE2*a*), the BWPs may be configured for load balancing or for a reduced UE capability. As shown, two BWPs (BWP1 412 and BWP2 414) configured for UE2*a* in a 400 MHz component carrier (CC) are not contiguous in frequency. For a second configuration of UE2 (UE 2*b*), the BWP1 416 and BWP2 418 of the 400 MHz CC partially overlap. As depicted, BWP2 utilizes a larger bandwidth than BWP1.

It should be understood that the bandwidth size may vary from the examples depicted in FIG. 4 and described above. These examples are provided for the convenience of describing aspects of the disclosure.

In various implementations, a UE may provide UE assistance information (UAI) for BWP adaptation in a RRC message. That RRC message may be sent to the core network 102 on the signaling radio bearer. The RRC message may include information indicating the UE's preferred BWP index, the maximum aggregated bandwidth, and the number of component carriers for carrier aggregation. In some implementations, the maximum aggregated bandwidth and number of component carriers may be those preferred by the UE, while other implementations the maximum aggregated bandwidth and number of component carriers may represent what the UE is configured to support.

In some implementations of BWP, a UE may receive a RRC reconfiguration message from a source cell for handover to a target cell. The received RRC reconfiguration message can include the BWP configurations and the random access channel (RACH) resource configurations of the target cell.

In some instances, the UE may be configured for reduced capability, referred to as "RedCap." RedCap (also referred to as NR-Light or NR-Lite) is a feature supported in some 5G NR networks where UEs may, among other features, operate with fewer antennas (e.g., 1 or 2 antennas) and/or other reduced capabilities. A RedCap UE typically includes reduced capabilities for lower cost and lower complexity. As a result, a RedCap UE may utilize enhancements for coverage and power savings to compensate for the reduced capabilities.

One or more aspects of the present disclosure may include modifications to the UE assistance information (UAI) transmission during handover, where the UAI may be transmitted together with a measurement report, or separately transferred during a RACH procedure. In addition to the power saving benefits resulting from BWP adaptation, the proposed UAI may also facilitate coverage enhancement and resource allocation/utilization efficiency of a UE, including RedCap UEs, in the target cell.

Figure 5:
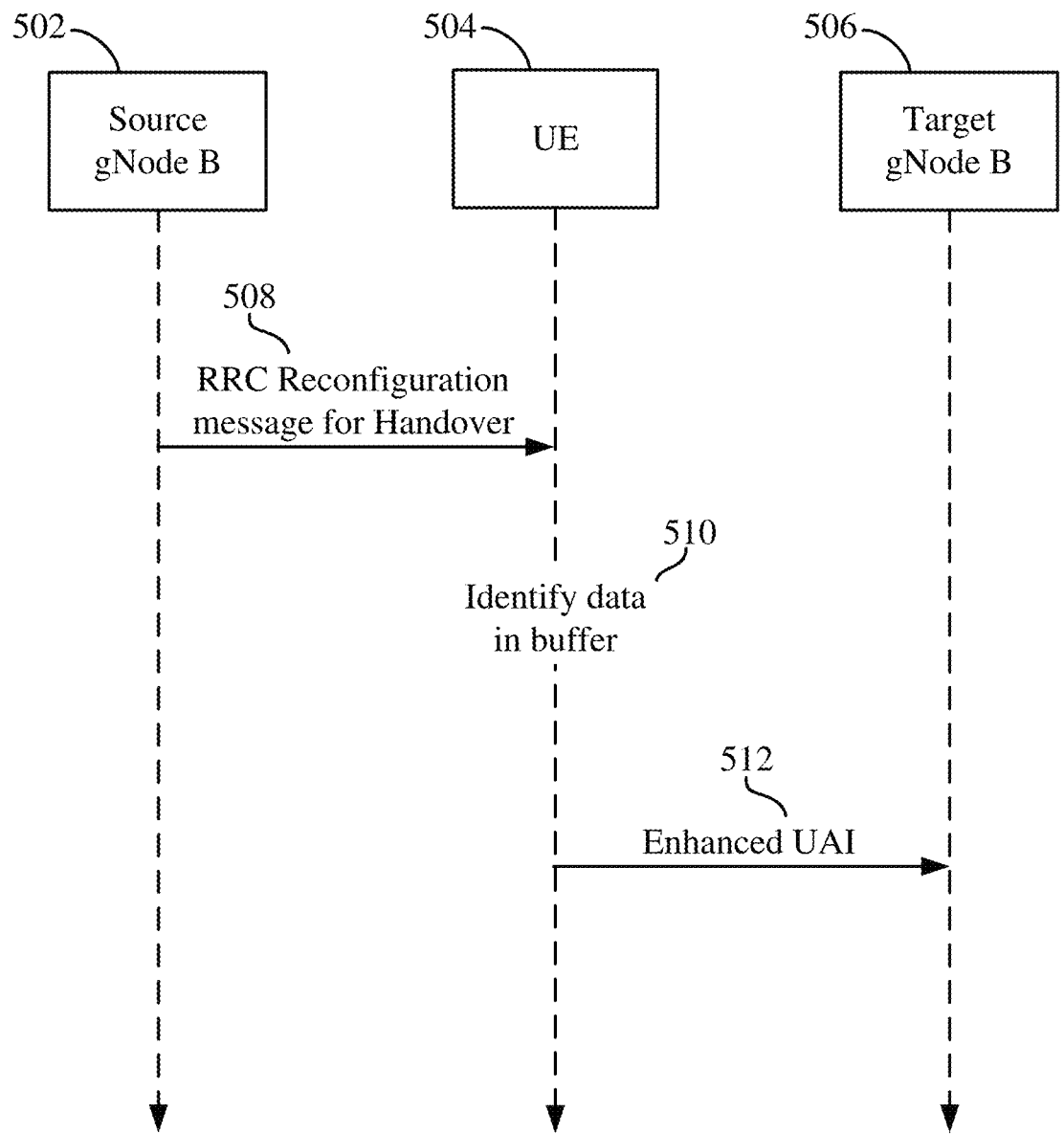
FIG. 5 is a flow diagram illustrating an example for communicating an enhanced UAI according to at least one example.

FIG. 5 is a flow diagram illustrating an example for communicating an enhanced UAI according to at least one example. A source gNode B 502, UE 504, and target gNode B 506 are depicted for illustrative purposes. As shown, the source gNode B 502 may send an RRC reconfiguration message 508 to the UE 504. As noted above, the RRC reconfiguration message 508 may include a first active BWP and RACH resource configuration of a target cell for a handover. In some implementations, the RRC reconfiguration message 508 may further include an acknowledgement message for enhanced UAI.

At 510, the UE 504 may identify data in its buffer for transmission. For example, the UE 504 may have user plane or control plane data in the buffer. As a result, the UE 504 can send an enhanced UAI 512 to the target gNode B 506. The enhanced UAI 512 is shown being sent directly to the target gNode B 506, but it should be understood that various examples may include the UE 504 sending the enhanced UAI indirectly to the target gNode B 506 (e.g., via the source gNode B 502).

In at least one implementation of the present disclosure, the enhanced UAI 512 may include various information to assist the target gNode B 506 with BWP selection for the UE 504. For example, an enhanced UAI 512 of the present disclosure may include one or more of a preferred bandwidth index, a preferred bandwidth aggregation, and/or a preferred number of component carriers for bandwidth aggregation.

In addition, when a UE 504 (e.g., a RedCap UE) has data in its buffer at the time of a handover (e.g., user plane data, control plane data), the UE 504 may transmit this data to the target gNode B 506 during the handover using contention-based random access or contention-free random access. To facilitate this early data transmission during the handover, the enhanced UAI 512 may indicate a preferred BWP and RACH type configurations. Further, the enhanced UAI 512 may include a report from the UE 504 of one or more of the UE's capabilities. When early data transmission during the handover is successful, such a data transmission may facilitate power saving in the UE 504 and a reduction in signaling overhead.

Thus, the enhanced UAI 512 may include an indication of the UE preferred bandwidth, modulation and coding scheme (MCS) and RACH type configurations. These selections may be dependent on the buffered data size, coverage, and latency requirements. The coverage may be derived by the UE 504 from SSB or CSI-RS based measurements of the target gNode B 506. Additionally, based on the latency requirements associated with the buffered data, the UAI 512 may include an indication of whether contention-free random access or contention-based random access is preferred by the UE 504, where contention-free random access typically may have a lower latency compared to contention-based random access, and contention-based random access may make a more efficient use of resources.

Additionally, the enhanced UAI 512 may include an indication of a preference for a larger bandwidth than the minimum CORESET0, subject to any bandwidth reduction constraint of the UE 504, such as when the UE 504 is a RedCap UE. Such a preference may be beneficial to the UE 504 to achieve higher downlink coverage for random access response (RAR) and contention resolution messages during a random access procedure.

The enhanced UAI 512 may further include a partial UE capability report. Typically, the UE 504 may transmit a full UE capability report after RRC connection. According to one or more aspects, the enhanced UAI 512 can include implicit or partial UE capability reporting, which is received before RRC connection is complete. In some examples, the UE capability report in the enhanced UAI 512 may be utilized by the target gNode B 506 in optimizing resource allocation.

In some implementations, the UE 504 may transmit the enhanced UAI 512 utilizing multiplexing to multiplex the enhanced UAI 512 with a measurement report of the target cell (e.g., a CSI report for the target cell). In this example, the transmission with the multiplexed enhanced UAI 512 and measurement report is sent to the target gNode B 506 indirectly. For instance, the multiplexed transmission with the enhanced UAI and measurement report is sent to the source gNode B 502, and the source gNode B 502 forwards the enhanced UAI to the target gNode B 506. The enhanced UAI 512 may be multiplexed with a measurement report as either a MAC control element (CE) or uplink control information (UCI). Such multiplexing may be utilized when the buffer data (e.g., user plane data, control plane data) arrives before the UE 504 transmits the measurement report. Further, when the measurements of multiple beams are reported, the UAI can be beam-specific or cell-specific. In the case that the UAI is beam-specific, a UAI may be provided for each beam.

Figure 6:
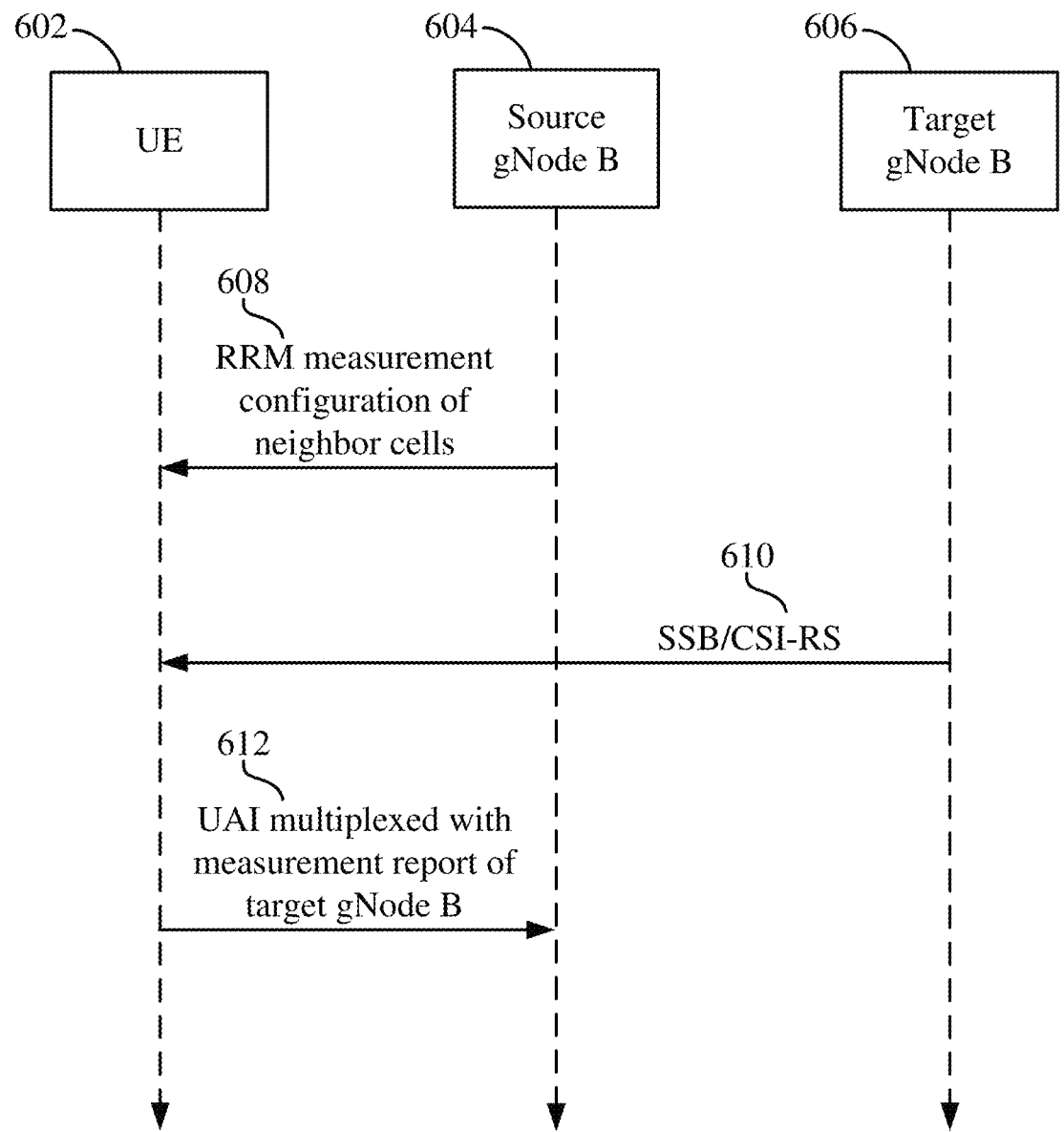
FIG. 6 is a flow diagram illustrating an example for communicating an enhanced UAI according to at least one example.

An example communication flow is depicted in FIG. 6. As shown, the UE 602 may receive a radio resource management (RRM) measurement configuration of neighbor cells 608 from the source gNode B 604, and at least one SSB/CSI-RS beam 610 from the target gNode B 606. The UE 602 can measure the RSRP or SINR of the SSB/CSI-RS beam(s) and send the enhanced UAI multiplexed with the measurement report 612 including the measured RSRP or SINR to the source gNode B 604, where it is later forwarded to the target gNode B 606.

Referring again to FIG. 5, the UE 504 may transmit the enhanced UAI 512 implicitly by physical RACH (PRACH) resource selection in some implementations. For example, in cases where multiplexing with a measurement report is not feasible, or the buffer data arrives after transmission of the measurement report, the UE 504 may implicitly convey information by PRACH resource selection. In such implementations, the RRC reconfiguration message 508 may include a mapping rule between multiple BWP configurations and RACH resources, such that each of the plurality of BWPs is associated with a particular RACH resource. The UE 504 may determine a preferred BWP, and may select the PRACH resource associated with the preferred BWP based on the mapping rule. The UE 504 may then transmit message 1 (in 4-step RACH) or message A (in 2-step RACH) with a PRACH preamble using the selected PRACH resource associated with the preferred BWP. The target gNode B 506 then is informed of the preferred BWP by identifying the PRACH resource utilized to send the message 1 or message A transmission, and then identifying the BWP associated with the specific PRACH resource.

Figure 7:
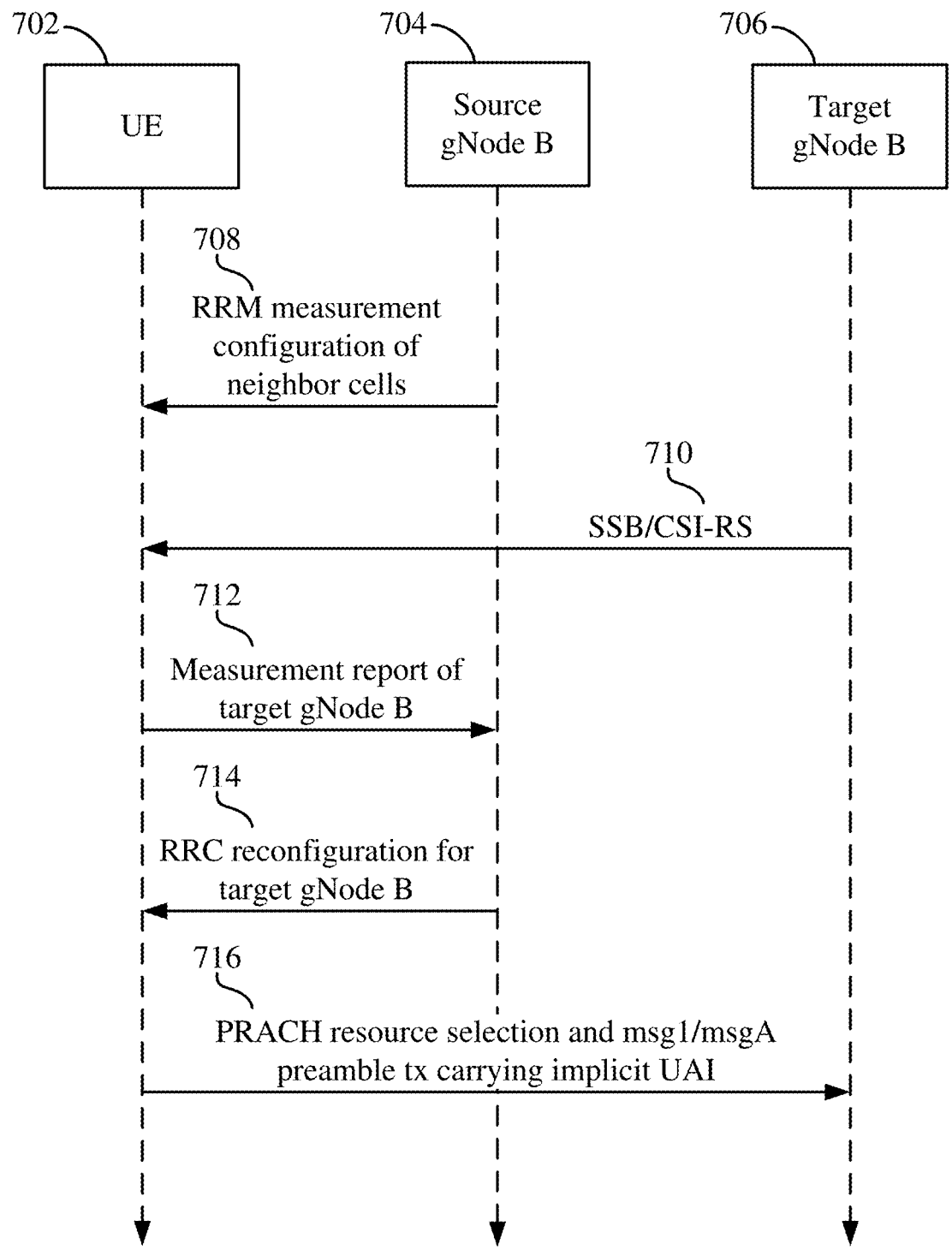
FIG. 7 is a flow diagram illustrating an example for communicating an enhanced UAI according to at least one example.

An example communication flow is depicted in FIG. 7. As shown, the UE 702 may receive an RRM measurement configuration of neighbor cells 708 from the source gNode B 704, and at least one SSB/CSI-RS beam 710 from the target gNode B 706. The UE 702 can measure the RSRP or SINR of the SSB/CSI-RS beam(s) and send a measurement report 712 of the target gNode B 706 to the source gNode B 704. The UE 702 can then receive an RRC reconfiguration message 714 from the source gNode B 704, where the RRC reconfiguration message 714 indicates the mapping rule between the BWP configurations and the RACH resources. The UE 702 sends the message 1 (in 4-step RACH) or message A (in 2-step RACH) with a PRACH preamble 716 using the selected PRACH resource associated with the preferred BWP to the target gNode B 706.

As an example, in 2-step RACH, the UE 702 may transmit MsgA 716 to the target gNode B 706. The MsgA 716 transmission may include PRACH and PUSCH transmissions, respectively. The PRACH transmission may include a PRACH preamble sequence. In one example of a contention-based random access (CBRA) procedure, the UE may randomly select a PRACH preamble sequence from a set of available preamble sequences. In an example of a contention-free random access (CFRA) procedure, the target gNode B 706 may assign a PRACH preamble to the UE 702. In some examples, the PUSCH transmission may include a radio network temporary identifier (RNTI) and/or other information. In some examples, the PUSCH may include information associated with a cell RNTI (C-RNTI) that is specific to the UE. The target gNode B 706 may use the C-RNTI in subsequent transmissions addressed to the UE 702. For example, the target gNode B 706 may scramble a PDCCH destined for the UE with the C-RNTI specific to the UE. When the target gNode B 706 receives MsgA 716, the target gNode B 706 detects the PRACH preamble. If MsgA 716 includes a PUSCH transmission, the target gNode B 706 can further decode the PUSCH. In response to MsgA 716, the target gNode B 706 can send a MsgB including a random access response (RAR), not shown for simplicity, to the UE 702 in this two-step RACH procedure. MsgB may include, for example, a PDSCH including the RAR. In a CBRA example, MsgB may also include a contention resolution message in the PDSCH.

In 4-step RACH, the UE 702 may transmit Msg1 including the selected PRACH preamble to the target gNode B 706. In one example of a CBRA procedure, the UE may randomly select the PRACH preamble. In an example of a CFRA procedure, the target gNode B 706 may assign the PRACH preamble to the UE 702. If the preamble is successfully detected by the target gNode B 706, the target gNode B 706 may transmit Msg2 including the RAR. The RAR may include a PDCCH and PDSCH. The Msg2 (PDCCH+PDSCH) may include an identifier of the preamble sent by the UE 702, a Timing Advance (TA), a temporary cell radio network temporary identifier (TC-RNTI) or random access RNTI (RA-RNTI) for the UE 702 and a grant of uplink resources. A MAC CE within the PDSCH may further include an acknowledgement of Msg1 and the uplink grant. The UE 702 may then transmit an uplink message (Msg3) using the uplink resources to the target gNode B 706. Upon successfully decoding Msg3, the target gNode B 706 may transmit a contention resolution message (Msg4) to the UE 702.

Referring again to FIG. 5, the UE 504 may transmit the enhanced UAI 512 in a payload of a RACH message in some implementations. Such implementations may be utilized in some examples in cases where the RRC reconfiguration message 508 indicates multiple BWP configurations, where no mapping rule is configured between BWPs and RACH resources, and where multiplexing with a measurement report is not feasible or the buffer data arrives after transmission of the measurement report. Initially, the UE 504 may determine a preferred BWP.

Figure 8:
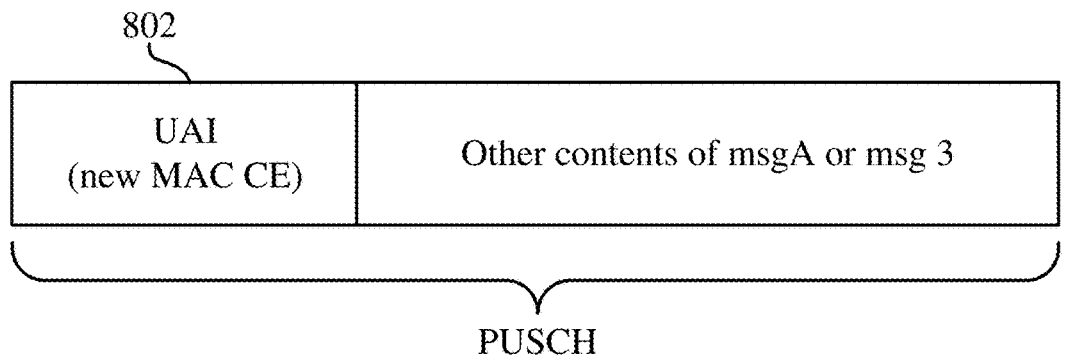
FIG. 8 is a block diagram illustrating an example of transmitting an enhanced UAI in a MAC CE and MAC subheader in a PUSCH of message A of a 2-step RACH procedure.
Figure 9:
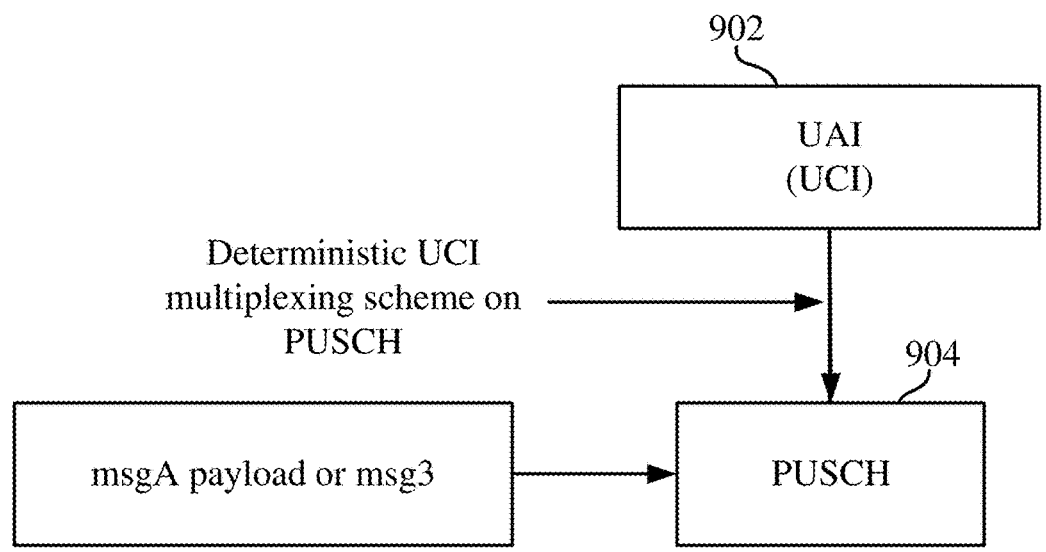
FIG. 9 is a block diagram illustrating an example of specifying a mapping relationship between an enhanced UAI and UCI, and utilizing a deterministic multiplexing scheme to multiplex the UCI with a PUSCH of message A or message 3.

In at least one example depicted in FIG. 8, a new MAC CE and MAC sub-header 802 may be specified to support UAI transmission in a PUSCH of message A of a 2-step RACH procedure or message 3 of a 4-step RACH procedure. In at least one other example depicted in FIG. 9, a mapping relationship between UAI and UCI may be specified, and the UCI 902 may be multiplexed with a PUSCH 904 of message A or message 3 using deterministic UCI resource allocation and a piggyback mechanism. In one aspect of the second example, the piggyback mechanism may include puncturing of a fixed number of REs around a DMRS of a PUSCH.

Figure 10:
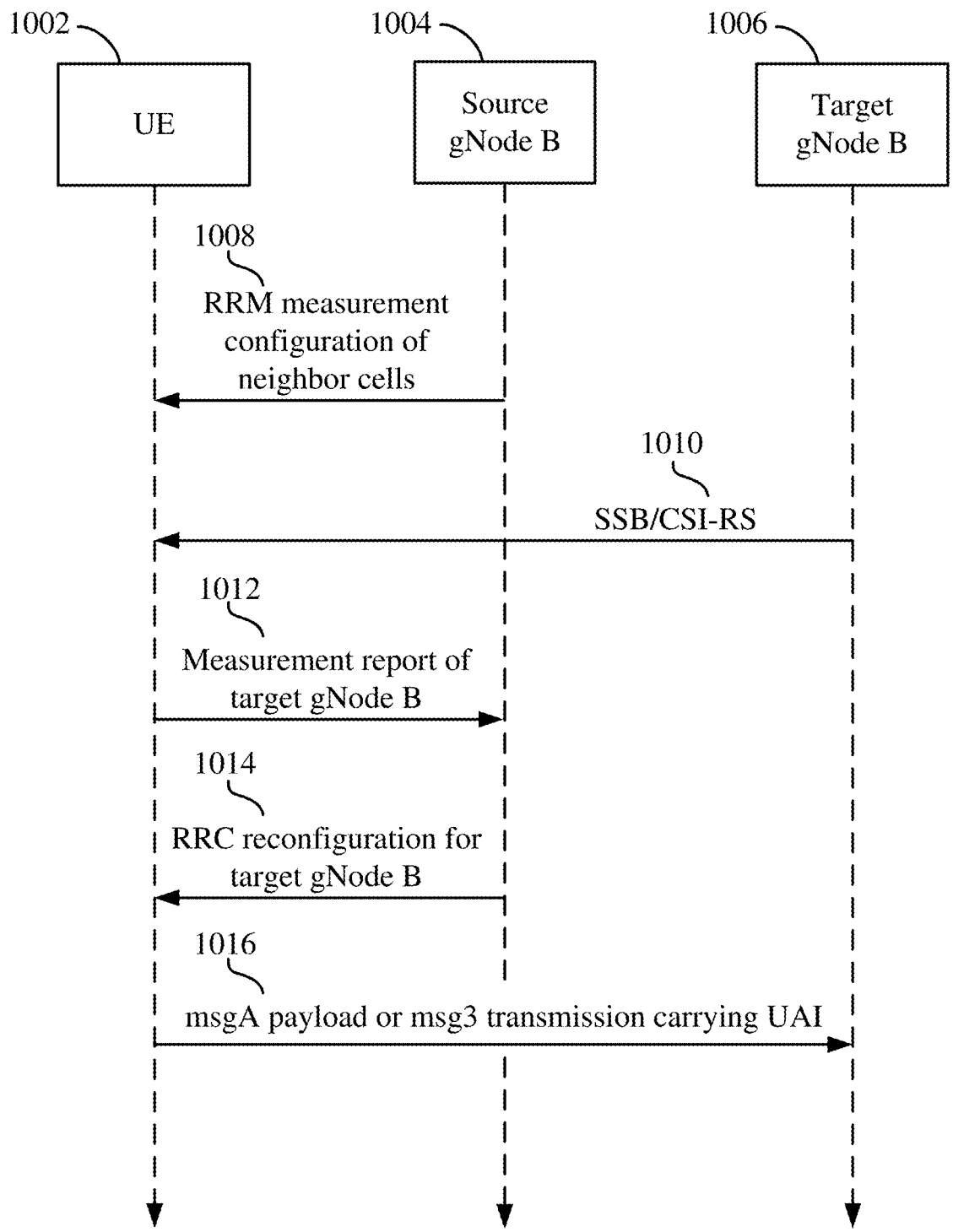
FIG. 10 is a flow diagram illustrating an example for communicating an enhanced UAI according to at least one example.

An example communication flow is depicted in FIG. 10. As shown, the UE 1002 may receive an RRM measurement configuration 1008 of neighbor cells from the source gNode B 1004, and at least one SSB/CSI-RS beam 1010 from the target gNode B 1006. The UE 1002 can measure the RSRP or SINR of the SSB/CSI-RS beam(s) and send a measurement report 1012 of the target gNode B 1006 to the source gNode B 1004. The UE 702 can then receive an RRC reconfiguration message 1014 for the target gNode B 1006 from the source gNode B 1004. The UE 1002 then sends the enhanced UAI 1016 to the target gNode B 1006 in the MsgA payload for 2-step RACH or Msg3 payload for 4-step RACH, as described above.

Figure 11:
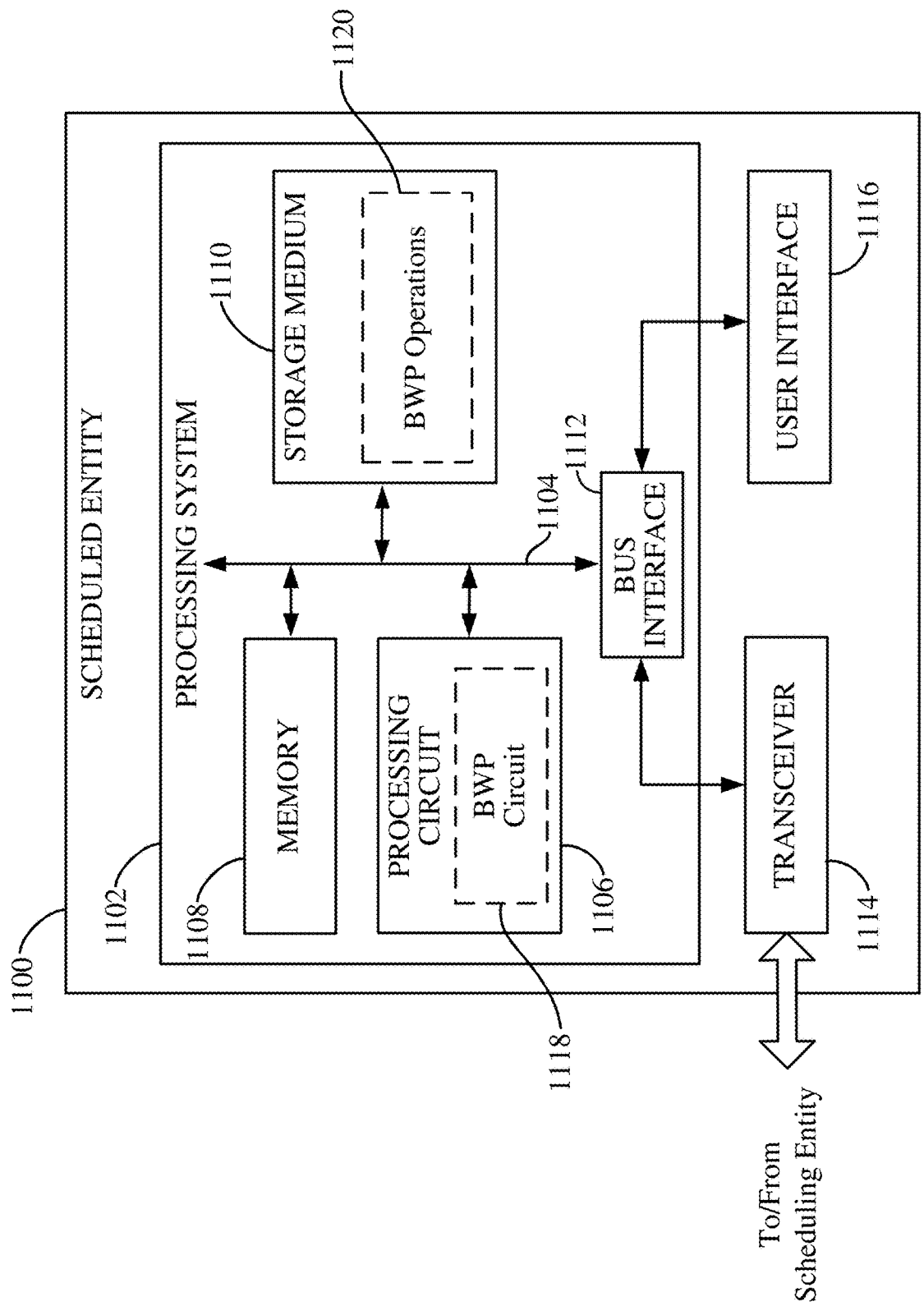
FIG. 11 is a block diagram illustrating an example of a hardware implementation for a scheduled entity according to some examples.

FIG. 11 is a block diagram illustrating an example of a hardware implementation of a scheduled entity 1100 employing a processing system 1102 according to at least one example of the present disclosure. For example, the scheduled entity 1100 may correspond to any of the UEs or other scheduled entities shown and described above in reference to FIGS. 1, 2, 5, 6, 7, and/or 10.

In this example, the processing system 1102 is implemented with a bus architecture, represented generally by the bus 1104. The bus 1104 may include any number of interconnecting buses and bridges depending on the specific application of the processing system 1102 and the overall design constraints. The bus 1104 communicatively couples together various circuits including one or more processors (represented generally by the processing circuit 1106), a memory 1108, and computer-readable media (represented generally by the storage medium 1110). The bus 1104 may also link various other circuits such as timing sources, peripherals, voltage regulators, and power management circuits, which are well known in the art, and therefore, will not be described any further. A bus interface 1112 provides an interface between the bus 1104 and a transceiver 1114. The transceiver 1114 provides a means for communicating with various other apparatus over a transmission medium. For example, the transceiver 1114 may include a receive chain to receive one or more wireless signals, and/or a transmit chain to transmit one or more wireless signals. Depending upon the nature of the apparatus, a user interface 1116 (e.g., keypad, display, speaker, microphone, joystick) may also be provided.

The processing circuit 1106 is responsible for managing the bus 1104 and general processing, including the execution of programming stored on the storage medium 1110. The programming, when executed by the processing circuit 1106, causes the processing system 1102 to perform the various functions described below for any particular apparatus. The computer-readable storage medium 1110 and the memory 1108 may also be used for storing data that is manipulated by the processing circuit 1106 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1106 is arranged to obtain, process and/or send data, control data access and storage, issue commands, and control other desired operations. The processing circuit 1106 may include circuitry configured to implement desired programming provided by appropriate media, and/or circuitry configured to perform one or more functions described in this disclosure. For example, the processing circuit 1106 may be implemented as one or more processors, one or more controllers, and/or other structure configured to execute executable programming and/or execute specific functions.

Examples of the processing circuit 1106 may include a microprocessor, a microcontroller, a digital signal processor (DSP), a field programmable gate array (FPGA), a programmable logic device (PLD), a state machine, gated logic, a discrete hardware circuit, and other suitable hardware configured to perform the various functionality described throughout this disclosure. In various examples, the scheduled entity 1100 may be configured to perform any one or more of the functions described herein. That is, the processing circuit 1106, as utilized in the scheduled entity 1100, may be used to implement any one or more of the processes and procedures described below.

The processing circuit 1106 may in some instances be implemented via a baseband or modem chip and in other implementations, the processing circuit 1106 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc. These examples of the processing circuit 1106 are for illustration and other suitable configurations within the scope of the present disclosure are also contemplated.

In some instances, the processing circuit 1106 may include a BWP circuit 1118. The BWP circuit 1118 may generally include circuitry configured to receive an RRC reconfiguration message indicating a handover from a source cell to a target cell, identify uplink data in a buffer (e.g., a buffer implemented by the memory 1108 and/or the storage medium 1110), and send an enhanced UAI transmission to the target cell, where the enhanced UAI transmission indicates a preferred BWP, as described within the present disclosure.

The storage medium 1110 may represent one or more computer-readable devices for storing programming, such as processor executable code or instructions (e.g., software, firmware), electronic data, databases, or other digital information. The storage medium 1110 may also be used for storing data that is manipulated by the processing circuit 1106 when executing programming. The storage medium 1110 may be any available non-transitory media that can be accessed by a general purpose or special purpose processor, including portable or fixed storage devices, optical storage devices, and various other mediums capable of storing, containing and/or carrying programming. By way of example and not limitation, the storage medium 1110 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 1110 may be coupled to the processing circuit 1106 such that the processing circuit 1106 can read information from, and write information to, the storage medium 1110. That is, the storage medium 1110 can be coupled to the processing circuit 1106 so that the storage medium 1110 is at least accessible by the processing circuit 1106, including examples where the storage medium 1110 is integral to the processing circuit 1106 and/or examples where the storage medium 1110 is separate from the processing circuit 1106 (e.g., resident in the processing system 1102, external to the processing system 1102, distributed across multiple entities).

Programming stored by the storage medium 1110, when executed by the processing circuit 1106, can cause the processing circuit 1106 to perform one or more of the various functions and/or process steps described herein. In at least some examples, the storage medium 1110 may include BWP operations 1120 generally configured to cause the processing circuit 1106 to receive an RRC reconfiguration message indicating a handover from a source cell to a target cell, identify uplink data in a buffer (e.g., a buffer implemented by the memory 1108 and/or the storage medium 1110), and send an enhanced UAI transmission to the target cell, where the enhanced UAI transmission indicates a preferred BWP, as described herein.

Figure 12:
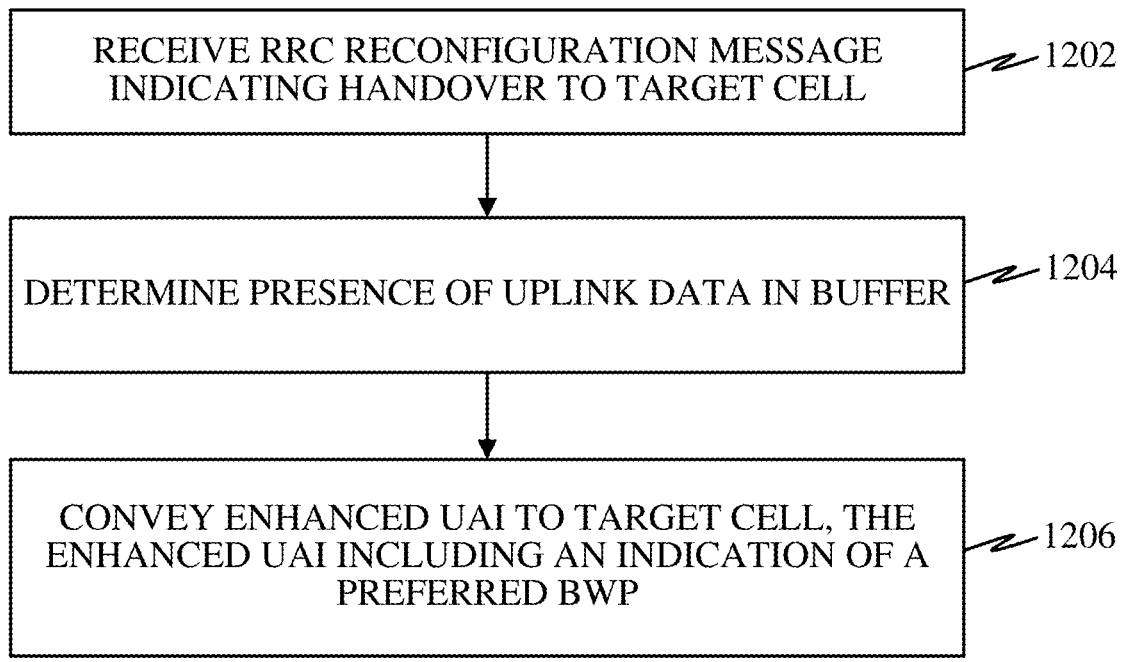
FIG. 12 is a flow diagram illustrating a wireless communication method (e.g., operational on or via a scheduled entity) according to some examples.

Generally speaking, the scheduled entity 1100 may perform any or all of the methods described above with reference to FIGS. 5-10. FIG. 12 shows a flow diagram illustrating a wireless communication method (e.g., operational on or via a scheduled entity 1100) according to some examples. As described below, some or all illustrated features may be omitted in a particular implementation within the scope of the present disclosure, and some illustrated features may not be required for implementation of all examples. In some examples, the process may be carried out by the scheduled entity 1100 illustrated in FIG. 11. In some examples, the process may be carried out by any suitable apparatus or means for carrying out the functions or algorithm described below.

As shown, a scheduled entity may receive an RRC reconfiguration message from a source cell indicating a handover from the source cell to a target cell at 1202. For example, the processing circuit 1106 shown and described above in connection with FIG. 11 may provide a means to receive an RRC reconfiguration message via the transceiver 1114 from a source cell. In some implementations, the received RRC reconfiguration message may indicate multiple BWP configurations. In some implementations, the received RRC reconfiguration message can include a mapping rule between BWP configurations and RACH resource configurations.

At 1204, the scheduled entity may determine the presence of uplink data in a buffer. For example, the BWP circuit 1118 shown and described above in connection with FIG. 11 may provide a means to determine the presence of uplink data in a buffer. Such uplink data may include user plane data and/or control plane data.

At 1206, the scheduled entity may convey an enhanced UAI transmission to the target cell, with the enhanced UAI indicating a BWP for the target cell. For example, the BWP circuit 1118 shown and described above in connection with FIG. 11 may provide a means to convey an enhanced UAI via the transceiver 1114 toward the target cell. The enhanced UAI may be conveyed directly to the target cell from the scheduled entity in some implementations, or may be conveyed to the target cell indirectly, such as through the source cell in other implementations.

In various implementations, the enhanced UAI transmission may further indicate at least one of a preferred bandwidth, a preferred modulation and coding scheme (MCS), a preferred RACH configuration, a preference between contention-free random access and contention-based random access, or partial UE capabilities.

In one or more implementations, the scheduled entity may convey the enhanced UAI transmission by multiplexing the enhanced UAI transmission with a measurement report of the target cell. The scheduled entity may further convey the multiplexed enhanced UAI transmission and the measurement report of the target cell to the source cell.

As noted above with reference to reception of the RRC reconfiguration message at 1202, the received RRC reconfiguration message may include a mapping rule between BWP configurations and RACH resource configurations. In such instances, the scheduled entity may convey the UAI by selecting the preferred BWP, select a PRACH resource associated with the selected BWP according to the mapping rule between BWP configurations and RACH resource configurations, and transmit a PRACH preamble utilizing the selected PRACH resource associated with the selected BWP.

In one or more implementations, the scheduled entity may convey the UAI by transmitting an indication of the preferred BWP in a payload of a RACH message. In some examples, the scheduled entity may utilize a MAC CE and MAC sub-header configured to support transmission of an enhanced UAI in a PUSCH of msgA or msg3. In some examples, the scheduled entity may utilize a mapping relationship between UAI and UCI, and may multiplex the UCI with a PUSCH of msgA or msg3 using a deterministic UCI resource allocation and a piggyback mechanism.

In one configuration, the scheduled entity 1100 includes means for receiving a radio resource control (RRC) reconfiguration message indicating a handover from source cell to a target cell, means for identifying uplink data in a buffer, and means for conveying an enhanced UE assistance information (UAI) transmission to the target cell in response to the RRC reconfiguration message and the identification of uplink data in the buffer, the enhanced UAI indicating a preferred bandwidth part (BWP) of the target cell. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, 5-7, 10 and/or 11, and utilizing, for example, the processes and/or algorithms described herein in relation to FIG. 12.

Figure 13:
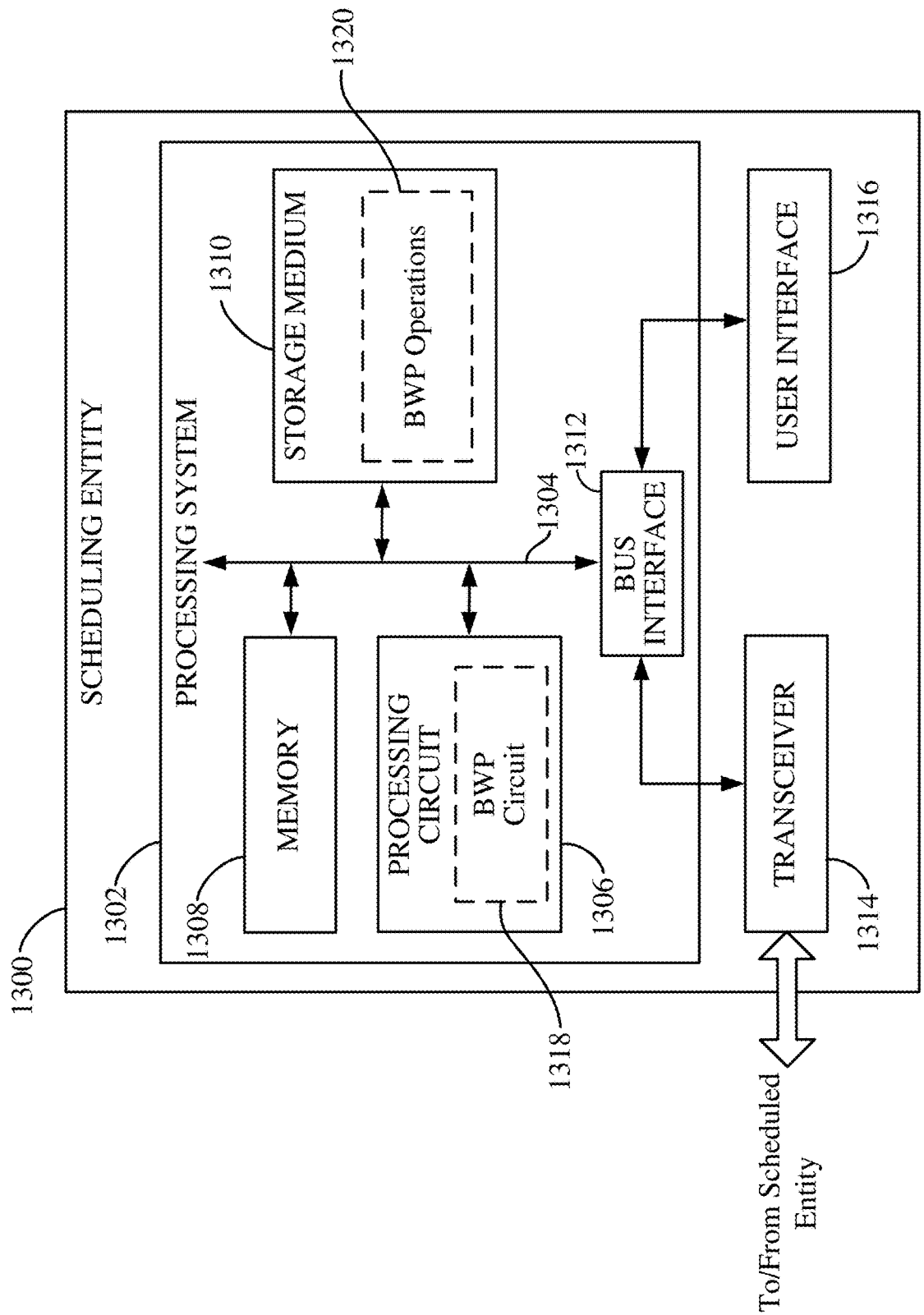
FIG. 13 is a block diagram illustrating an example of a hardware implementation for a scheduling entity according to some examples.

FIG. 13 is a block diagram illustrating an example of a hardware implementation of a scheduling entity 1300 employing a processing system 1302 according to at least one example of the present disclosure. Similar to the processing system 1102 in FIG. 11, the processing system 1302 may be implemented with a bus architecture, represented generally by the bus 1304. The bus 1304 may include any number of interconnecting buses and bridges depending on the specific application of the processing system 1302 and the overall design constraints. The bus 1304 communicatively couples together various circuits including one or more processors (represented generally by the processing circuit 1306), a memory 1308, and computer-readable media (represented generally by the storage medium 1310). The bus 1304 may also link various other circuits such as timing sources, peripherals, voltage regulators, and power management circuits, which are well known in the art, and therefore, will not be described any further. A bus interface 1312 provides an interface between the bus 1304 and a transceiver 1314. The transceiver 1314 provides a means for communicating with various other apparatus over a transmission medium. For example, the transceiver 1314 may include a receive chain to receive one or more wireless signals, and/or a transmit chain to transmit one or more wireless signals. Depending upon the nature of the apparatus, a user interface 1316 (e.g., keypad, display, speaker, microphone, joystick) may also be provided.

The processing circuit 1306 is responsible for managing the bus 1304 and general processing, including the execution of programming stored on the computer-readable storage medium 1310. The programming, when executed by the processing circuit 1306, causes the processing system 1302 to perform the various functions described below for any particular apparatus. The computer-readable storage medium 1310 and the memory 1308 may also be used for storing data that is manipulated by the processing circuit 1306 when executing programming.

The processing circuit 1306 is arranged to obtain, process and/or send data, control data access and storage, issue commands, and control other desired operations. The processing circuit 1306 may include circuitry configured to implement desired programming provided by appropriate media in at least one example, and/or circuitry configured to perform one or more functions described in this disclosure. The processing circuit 1306 may be implemented and/or configured according to any of the examples of the processing circuit 1106 described above.

In some instances, the processing circuit 1306 may include a BWP circuit 1318. In some examples, the BWP circuit 1318 may generally include circuitry configured to receive an enhanced UAI transmission from a scheduled entity, where the enhanced UAI indicates a preferred BWP for the scheduled entity, as described herein. In some examples, the BWP circuit 1318 may generally include circuitry configured to send an RRC reconfiguration message to a scheduled entity, where the RRC reconfiguration message includes a mapping rule between BWP configurations and RACH resource configuration, as described herein.

The storage medium 1310 may represent one or more computer-readable devices for storing programming, such as processor executable code or instructions (e.g., software, firmware), electronic data, databases, or other digital information. The storage medium 1310 may be configured and/or implemented in a manner similar to the storage medium 1110 described above.

Programming stored by the storage medium 1310, when executed by the processing circuit 1306, can cause the processing circuit 1306 to perform one or more of the various functions and/or process steps described herein. In at least some examples, the storage medium 1310 may include BWP operations 1320 configured to cause the processing circuit 1306 to receive an enhanced UAI transmission from a scheduled entity, where the enhanced UAI indicates a preferred BWP for the scheduled entity, as described herein. In at least some examples, the storage medium 1310 may include BWP operations 1320 configured to cause the processing circuit 1306 to send an RRC reconfiguration message to a scheduled entity, where the RRC reconfiguration message includes a mapping rule between BWP configurations and RACH resource configuration, as described herein. Generally speaking, the scheduling entity 1300 may perform any or all of the methods described above for the source gNode B and/or the target gNode B with reference to FIGS. 5-10 above.

Figure 14:
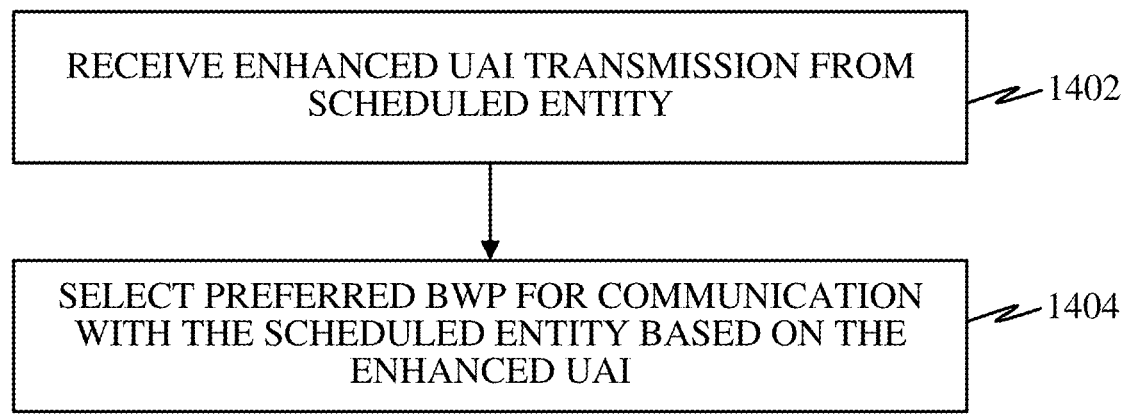
FIG. 14 is a flow diagram illustrating a wireless communication method (e.g., operational on or via a scheduling entity) according to some examples.

FIG. 14 is a flow diagram illustrating a wireless communication method (e.g., operational on or via a scheduling entity) according to some examples. As described below, some or all illustrated features may be omitted in a particular implementation within the scope of the present disclosure, and some illustrated features may not be required for implementation of all examples. In some examples, the process may be carried out by the scheduling entity 1300 illustrated in FIG. 13. In some examples, the process may be carried out by any suitable apparatus or means for carrying out the functions or algorithm described below.

The scheduling entity may receive an enhanced UAI transmission from a scheduled entity at 1402. For example, the processing circuit 1306 (e.g., BWP circuit 1318) shown and described above in connection with FIG. 13 may provide a means to receive the enhanced UAI transmission via the transceiver 1314 from a scheduled entity.

In some implementations, the received enhanced UAI may further indicate at least one of a preferred bandwidth, a preferred modulation and coding scheme (MCS), a preferred RACH configuration, a preference between contention-free random access and contention-based random access, or partial UE capabilities.

In some implementations, the scheduling entity may receive the enhanced UAI multiplexed with a measurement report of a cell associated with the scheduling entity.

In some implementations, the scheduling entity may include a mapping rule stored thereon. The mapping rule may include mapping between BWP configurations and RACH resource configurations. In such implementations, the scheduling entity may receive a PRACH preamble from the scheduled entity utilizing a particular PRACH resource, and then determine the preferred BWP from the BWP configuration associated with the particular PRACH resource utilized by the scheduled entity for the PRACH preamble.

In some implementations, the scheduling entity may receive the enhanced UAI indicating the preferred BWP in a payload of a RACH message. In some examples, the enhanced UAI may be received in a MAC CE and MAC sub-header in a PUSCH of msgA or msg3. In some examples, a mapping relationship may exist between the UAI and UCI, and the UCI may be received multiplex with a PUSCH of msgA or msg3 by use of a deterministic UCI resource allocation and a piggyback mechanism.

At 1404, the scheduling entity may select a preferred BWP for communication with the scheduled entity based on the received enhanced UAI. For example, the BWP circuit 1318 shown and described above in connection with FIG. 13 may provide a means to select the preferred BWP for communication with the scheduled entity based on the received enhanced UAI.

In one configuration, the scheduling entity 1300 includes means for receiving an enhanced UE assistance information (UAI) transmission from a scheduled entity indicating a preferred bandwidth part (BWP) for the scheduled entity and means for selecting the preferred BWP for communication with the scheduled entity based on the received enhanced UAI. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 5-7, 10 and/or 13, and utilizing, for example, the processes and/or algorithms described herein in relation to FIG. 14.

The following provides an overview of aspects of the present disclosure:

Aspect 1: A method operational on a scheduled entity, the method comprising: receiving a radio resource control (RRC) reconfiguration message indicating a handover from source cell to a target cell; identifying uplink data in the buffer; and conveying an enhanced UE assistance information (UAI) transmission to the target cell in response to the RRC reconfiguration message and the identification of uplink data in the buffer, the enhanced UAI indicating a preferred bandwidth part (BWP) of the target cell.

Aspect 2: The method of aspect 1, wherein the uplink data comprises user plane data or control plane data.

Aspect 3: The method of aspect 1 or 2, wherein the enhanced UAI transmission further indicates at least one of a preferred bandwidth, a preferred modulation and coding scheme (MCS), a preferred RACH configuration, a preference between contention-free random access and contention-based random access, or partial UE capabilities.

Aspect 4: The method of any of aspects 1 through 3, wherein conveying the enhanced UAI transmission comprises: multiplexing the enhanced UAI transmission with a measurement report of the target cell; and transmitting the multiplexed enhanced UAI transmission and the measurement report of the target cell to the source cell.

Aspect 5: The method of any of aspects 1 through 4, wherein the received RRC reconfiguration message includes a mapping rule between BWP configurations and RACH resource configurations.

Aspect 6: The method of aspect 5, wherein conveying the enhanced UAI transmission comprises: selecting a preferred BWP; selecting a PRACH resource associated with the selected BWP; and transmitting a PRACH preamble utilizing the selected PRACH resource associated with the selected BWP.

Aspect 7: The method of any of aspects 1 through 4, wherein conveying the enhanced UAI transmission comprises: transmitting an indication of a preferred BWP in a payload of a RACH message.

Aspect 8: The method of any of aspects 1 through 7, wherein conveying the enhanced UAI transmission comprises: conveying the enhanced UAI transmission directly or indirectly to the target cell.

Aspect 9: A scheduled entity comprising a transceiver, a buffer, and a processor communicatively coupled to the transceiver and buffer, the processor configured to perform a method of any one of aspects 1 through 8.

Aspect 10: A method operational on a scheduling entity, comprising: receiving an enhanced UE assistance information (UAI) transmission from a scheduled entity indicating a preferred bandwidth part (BWP) for the scheduled entity; and determining the preferred BWP for the scheduled entity based on the received enhanced UAI.

Aspect 11: The method of aspect 10, wherein the received enhanced UAI transmission further indicates at least one of a preferred bandwidth, a preferred modulation and coding scheme (MCS), a preferred RACH configuration, a preference between contention-free random access and contention-based random access, or partial UE capabilities.

Aspect 12: The method of aspect 10 or 11, wherein receiving the enhanced UAI transmission from a scheduled entity comprises: receiving the enhanced UAI multiplexed with a measurement report of a cell associated with the scheduling entity.

Aspect 13: The method of any of aspects 10 through 12, further comprising: storing a mapping rule between BWP configurations and RACH resource configurations.

Aspect 14: The method of aspect 13, further comprising: receiving a PRACH preamble from the scheduled entity utilizing a particular PRACH resource; and determining the preferred BWP based on a BWP configuration associated with the particular PRACH resource from the stored mapping rule.

Aspect 15: The method of any of aspects 10 or 11, receiving the enhanced UAI in a payload of a RACH message.

Aspect 16: The method of any of aspects 10 through 15, wherein receiving the enhanced UAI transmission from a scheduled entity comprises: receiving the enhanced UAI directly or indirectly from the scheduled entity.

Aspect 17: A scheduling entity comprising a transceiver, a memory, and a processor communicatively coupled to the transceiver and buffer, the processor configured to perform a method of any one of aspects 10 through 16.

Aspect 18: An apparatus for wireless communication comprising at least one means for performing a method of any one of aspects 1 through 8, or aspects 10 through 16.

Aspect 19: A non-transitory computer-readable medium having stored therein instructions executable by one or more processors of a user equipment to perform a method of any one of aspects 1 through 8, or aspects 10 through 16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP or combinations of such systems. These systems may include candidates such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and examples are discussed with specific details and particularity, one or more of the components, steps, features and/or functions illustrated in FIGS. 1, 2, 3, 4, 5, 6, 7, 8, 9, 10, 11, 12, 13, and/or 14 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 5, 6, 7, 10, 11, and/or 13 may be configured to perform or employ one or more of the methods, features, parameters, and/or steps described herein with reference to FIGS. 3, 4, 5, 7, 8, 9, 12, and/or 14. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such examples are merely illustrative and not restrictive of the scope of the disclosure, since various other additions and modifications to, and deletions from, the described examples will be apparent to one of ordinary skill in the art. Thus, the scope of the disclosure is only determined by the literal language, and legal equivalents, of the claims which follow.

What is claimed is:

1. A scheduled entity, comprising:
   a memory; and
   a processor communicatively coupled to the memory and configured to:
   receive a radio resource control (RRC) reconfiguration message indicating a handover from a source cell to a target cell;
   identify uplink data in a buffer; and
   transmit, to the target cell in association with the RRC reconfiguration message and the identification of the uplink data in the buffer, a random access channel (RACH) message that comprises a payload including enhanced UE assistance information (UAI), the enhanced UAI indicating a preferred bandwidth part (BWP) of the target cell.

2. The scheduled entity of claim 1, wherein the uplink data comprises user plane data or control plane data.

3. The scheduled entity of claim 1, wherein the enhanced UAI transmission further indicates at least one of a preferred bandwidth, a preferred modulation and coding scheme (MCS), a preferred random access channel (RACH) configuration, a preference between contention-free random access and contention-based random access, or partial UE capabilities.

4. The scheduled entity of claim 1, wherein the processor is configured to:
   multiplex the enhanced UAI transmission with a measurement report of the target cell; and
   transmit via the transceiver the multiplexed enhanced UAI transmission and the measurement report of the target cell to the source cell.

5. The scheduled entity of claim 1, wherein the received RRC reconfiguration message includes an acknowledgement message for UAI and a mapping rule between BWP configurations and RACH resource configurations.

6. The scheduled entity of claim 5, wherein the processor is configured to:
   select the preferred BWP;
   select a physical RACH (PRACH) resource associated with the preferred BWP based on the mapping rule; and
   transmit via the transceiver a PRACH preamble utilizing the selected PRACH resource associated with the preferred BWP.

7. The scheduled entity of claim 1, wherein the processor is configured to:
   convey the enhanced UAI transmission indirectly to the target cell.

8. A method operational on a scheduled entity, comprising:
   receiving a radio resource control (RRC) reconfiguration message indicating a handover from source cell to a target cell;
   identifying uplink data in a buffer; and
   transmitting, to the target cell in association with the RRC reconfiguration message and the identification of the uplink data in the buffer, a random access channel (RACH) message that comprises a payload including enhanced UE assistance information (UAI), the enhanced UAI indicating a preferred bandwidth part (BWP) of the target cell.

9. The method of claim 8, wherein the uplink data comprises user plane data or control plane data.

10. The method of claim 8, wherein the enhanced UAI transmission further indicates at least one of a preferred bandwidth, a preferred modulation and coding scheme (MCS), a preferred RACH configuration, a preference between contention-free random access and contention-based random access, or partial UE capabilities.

11. The method of claim 8, wherein the conveying the enhanced UAI transmission comprises:
    multiplexing the enhanced UAI transmission with a measurement report of the target cell; and
    transmitting the multiplexed enhanced UAI transmission and the measurement report of the target cell to the source cell.

12. The method of claim 8, wherein the received RRC reconfiguration message includes an acknowledgement message for UAI and a mapping rule between BWP configurations and RACH resource configurations.

13. The method of claim 12, wherein the conveying the enhanced UAI transmission comprises:
    selecting the preferred BWP;
    selecting a physical RACH (PRACH) resource associated with the preferred BWP based on the mapping rule; and
    transmitting a PRACH preamble utilizing the selected PRACH resource associated with the preferred BWP.

14. The method of claim 8, wherein the conveying the enhanced UAI transmission comprises:
    conveying the enhanced UAI transmission indirectly to the target cell.

15. A scheduling entity, comprising:
    a memory; and
    a processor communicatively coupled to the memory and configured to:
    receive enhanced UE assistance information (UAI) in a payload of a random access channel (RACH) message from a scheduled entity, the enhanced UAI indicating a preferred bandwidth part (BWP) for the scheduled entity; and
    select the preferred BWP for communication with the scheduled entity based on the received enhanced UAI.

16. The scheduling entity of claim 15, wherein the received enhanced UAI transmission further indicates at least one of a preferred bandwidth, a preferred modulation and coding scheme (MCS), a preferred RACH configuration, a preference between contention-free random access and contention-based random access, or partial UE capabilities.

17. The scheduling entity of claim 15, wherein the processor is configured to:
    receive the enhanced UAI multiplexed with a measurement report of a cell associated with the scheduling entity.

18. The scheduling entity of claim 15, wherein the memory includes a mapping rule between BWP configurations and RACH resource configurations.

19. The scheduling entity of claim 18, wherein the processor is further configured to:
   receive a PRACH preamble from the scheduled entity utilizing a particular PRACH resource; and
   determine the preferred BWP based on a BWP configuration associated with the particular PRACH resource based on the mapping rule.

20. The scheduling entity of claim 15, wherein the processor is configured to:
   receive the enhanced UAI indirectly from the scheduled entity.

21. A method operational on a scheduling entity, comprising:
   receiving enhanced UE assistance information (UAI) in a payload of a random access channel (RACH) message from a scheduled entity, the enhanced UAI indicating a preferred bandwidth part (BWP) for the scheduled entity; and
   selecting the preferred BWP for communication with the scheduled entity based on the received enhanced UAI.

22. The method of claim 21, wherein the received enhanced UAI transmission further indicates at least one of a preferred bandwidth, a preferred modulation and coding scheme (MCS), a preferred RACH configuration, a preference between contention-free random access and contention-based random access, or partial UE capabilities.

23. The method of claim 21, wherein the receiving the enhanced UAI transmission from a scheduled entity comprises:
   receiving the enhanced UAI multiplexed with a measurement report of a cell associated with the scheduling entity.

24. The method of claim 21, further comprising:
   storing a mapping rule between BWP configurations and RACH resource configurations.

25. The method of claim 24, further comprising:
   receiving a PRACH preamble from the scheduled entity utilizing a particular PRACH resource; and
   determining the preferred BWP based on a BWP configuration associated with the particular PRACH resource from the stored mapping rule.

26. The method of claim 21, wherein the receiving the enhanced UAI transmission from a scheduled entity comprises:
   receiving the enhanced UAI indirectly from the scheduled entity.

\* \* \* \* \*